United States Patent
Richard et al.

(10) Patent No.: US 11,159,940 B2
(45) Date of Patent: Oct. 26, 2021

(54) METHOD FOR MUTUAL AUTHENTICATION BETWEEN USER EQUIPMENT AND A COMMUNICATION NETWORK

(71) Applicant: ORANGE, Issy-les-Moulineaux (FR)

(72) Inventors: Benjamin Richard, Chatillon (FR);
Todor Gamishev, Chatillon (FR);
Gilles Macario-Rat, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 40 days.

(21) Appl. No.: 16/339,599

(22) PCT Filed: Oct. 2, 2017

(86) PCT No.: PCT/FR2017/052695
§ 371 (c)(1),
(2) Date: Apr. 4, 2019

(87) PCT Pub. No.: WO2018/065712
PCT Pub. Date: Apr. 12, 2008

(65) Prior Publication Data
US 2019/0246272 A1    Aug. 8, 2019

(30) Foreign Application Priority Data
Oct. 4, 2016  (FR) ...................................... 1659583

(51) Int. Cl.
*G06F 15/16* (2006.01)
*H04W 12/062* (2021.01)
(Continued)

(52) U.S. Cl.
CPC ......... *H04W 12/062* (2021.01); *H04L 9/3242* (2013.01); *H04L 63/0869* (2013.01);
(Continued)

(58) Field of Classification Search
CPC ... G06F 21/44; G06F 21/606; H04L 63/0428; H04L 9/08; H04L 9/088; H04L 9/30; H04L 9/32
See application file for complete search history.

(56) References Cited

U.S. PATENT DOCUMENTS 5,673,318 A * 9/1997 Bellare ................. H04L 9/0625
380/29
5,757,913 A * 5/1998 Bellare ................. H04L 9/0625
380/29
(Continued)

FOREIGN PATENT DOCUMENTS

EP          1603361 A1    12/2005
GB          2365688 A      2/2002
(Continued)

OTHER PUBLICATIONS

English translation of the International Search Report dated Nov. 24, 2017 for corresponding International Application No. PCT/FR2017/052695, filed Oct. 2, 2017.
(Continued)

*Primary Examiner* — Gary S Gracia
(74) *Attorney, Agent, or Firm* — David D. Brush; Westman, Champlin & Koehler, P.A.

(57) ABSTRACT

A method for mutual authentication between user equipment and a communications network. The network includes a mobility management entity and a home subscriber server. The method, implemented by the user equipment, includes: receiving an authentication challenge having an token based on a first index and a first authentication message calculated by the home subscriber server and based on a first sequence number; checking that a condition of a set is true, the set including: the first sequence number is the same as a second sequence number stored in the user equipment, and the first sequence number is the same as a preceding value of the (Continued)

second sequence number and the first index is higher than a second index stored in the client equipment; and calculating and sending, when a condition is true, an authentication result and an authentication message, based on the preceding value of the second sequence number.

9 Claims, 2 Drawing Sheets

(51) Int. Cl.
    *H04L 29/06*     (2006.01)
    *H04W 56/00*     (2009.01)
    *H04L 9/32*     (2006.01)
    *H04W 12/069*     (2021.01)
    *H04W 12/122*     (2021.01)
    *H04W 12/126*     (2021.01)
    *G06F 7/04*     (2006.01)
    *H04W 8/02*     (2009.01)

(52) U.S. Cl.
    CPC ....... *H04W 12/069* (2021.01); *H04W 12/122* (2021.01); *H04W 12/126* (2021.01); *H04W 56/001* (2013.01); *H04W 8/02* (2013.01)

(56) References Cited

U.S. PATENT DOCUMENTS

| | | | |
|---|---|---|---|
| 6,594,376 B2* | 7/2003 | Hoffman | G06Q 20/18 382/115 |
| 6,671,821 B1* | 12/2003 | Castro | G06F 21/577 714/4.3 |
| 6,728,261 B1* | 4/2004 | Sasson | H04L 69/16 370/401 |
| 6,798,785 B1* | 9/2004 | Sasson | H04L 69/16 370/401 |
| 6,985,608 B2* | 1/2006 | Hoffman | G06Q 20/02 382/115 |
| 7,215,667 B1* | 5/2007 | Davis | H04L 12/4633 370/389 |
| 7,248,719 B2* | 7/2007 | Hoffman | H04L 63/0861 382/115 |
| 7,272,129 B2* | 9/2007 | Calcev | H04J 3/0641 370/338 |
| 7,319,987 B1* | 1/2008 | Hoffman | G06Q 20/40 705/44 |
| 7,558,407 B2* | 7/2009 | Hoffman | G06Q 20/401 382/115 |
| 7,574,599 B1* | 8/2009 | Zhang | H04L 9/3242 713/168 |
| 7,631,193 B1* | 12/2009 | Hoffman | H04L 63/0861 713/186 |
| 7,649,873 B2* | 1/2010 | Bonta | H04W 48/10 370/338 |
| 7,706,255 B1* | 4/2010 | Kondrat | H04L 47/263 370/219 |
| 7,756,082 B1* | 7/2010 | Dhamdhere | H04W 36/0085 370/331 |
| 7,840,708 B2* | 11/2010 | Smith | H04L 63/104 709/246 |
| 8,014,305 B1* | 9/2011 | Gilbert | H04W 36/0085 370/252 |
| 8,155,029 B2* | 4/2012 | Rune | H04L 29/12311 370/254 |
| 8,189,604 B2* | 5/2012 | Rautiola | H04W 60/00 370/401 |
| 8,582,426 B2* | 11/2013 | Kirrmann | H04L 12/40189 370/225 |
| 8,582,588 B2* | 11/2013 | Rautiola | H04W 60/00 370/401 |
| 8,582,589 B2* | 11/2013 | Rautiola | H04W 60/00 370/401 |
| 8,635,353 B2* | 1/2014 | Pope | H04L 49/901 709/230 |
| 8,645,558 B2* | 2/2014 | Pope | G06F 13/00 709/230 |
| 8,645,785 B2* | 2/2014 | Venkataraj | H04L 1/1835 714/749 |
| 8,699,367 B1* | 4/2014 | Gilbert | H04W 36/0085 370/252 |
| 8,713,201 B2* | 4/2014 | Smith | H04L 63/083 709/246 |
| 8,724,803 B2* | 5/2014 | Semple | H04L 63/067 380/44 |
| 8,964,554 B2* | 2/2015 | Petry | H04W 12/037 370/235 |
| 9,043,380 B2* | 5/2015 | Pope | H04L 49/901 709/201 |
| 9,560,126 B2* | 1/2017 | van Bemmel | H04L 67/1034 |
| 9,560,172 B2* | 1/2017 | van Bemmel | H04L 69/22 |
| 9,924,557 B2* | 3/2018 | Rautiola | H04L 65/1073 |
| 9,942,210 B2* | 4/2018 | Liu | H04W 36/0038 |
| 9,955,238 B2* | 4/2018 | Du | H04W 4/70 |
| 9,967,900 B2* | 5/2018 | He | H04W 76/20 |
| 10,055,264 B2* | 8/2018 | Pope | H04L 69/16 |
| 10,225,879 B2* | 3/2019 | Chen | H04W 76/25 |
| 10,445,156 B2* | 10/2019 | Pope | G06F 13/00 |
| 10,499,425 B2* | 12/2019 | He | H04W 74/06 |
| 10,667,736 B2* | 6/2020 | Hettrick | G16H 50/30 |
| 10,728,212 B2* | 7/2020 | Xu | H04L 61/25 |
| 2005/0138379 A1* | 6/2005 | Semple | H04W 4/06 713/170 |
| 2005/0195975 A1* | 9/2005 | Kawakita | H04L 9/0825 380/30 |
| 2006/0029261 A1* | 2/2006 | Hoffman | G07C 9/37 382/115 |
| 2006/0083408 A1* | 4/2006 | Hoffman | G06F 21/32 382/115 |
| 2007/0086424 A1* | 4/2007 | Calcev | H04W 56/002 370/350 |
| 2007/0086426 A1* | 4/2007 | Bonta | H04W 48/10 370/350 |
| 2007/0223533 A1* | 9/2007 | Kirrmann | H04L 41/0659 370/469 |
| 2007/0291996 A1* | 12/2007 | Hoffman | G07C 9/38 382/115 |
| 2009/0049196 A1* | 2/2009 | Smith | H04L 63/083 709/245 |
| 2009/0267730 A1* | 10/2009 | Zhang | H04L 9/3273 340/5.8 |
| 2010/0235544 A1* | 9/2010 | Smith | H04L 63/08 709/246 |
| 2010/0238811 A1* | 9/2010 | Rune | H04W 8/26 370/248 |
| 2011/0013555 A1* | 1/2011 | Rautiola | H04W 60/00 370/328 |
| 2011/0264906 A1* | 10/2011 | Pourzandi | H04L 9/083 713/153 |
| 2011/0274034 A1* | 11/2011 | Rautiola | H04L 61/1511 370/328 |
| 2012/0124121 A1* | 5/2012 | Pope | H04L 49/9094 709/201 |
| 2012/0240000 A1* | 9/2012 | Venkataraj | H04L 1/1822 714/751 |
| 2012/0281623 A1* | 11/2012 | Rautiola | H04W 60/00 370/328 |
| 2012/0281624 A1* | 11/2012 | Rautiola | H04W 60/00 370/328 |
| 2012/0296952 A1* | 11/2012 | Pope | H04L 67/10 709/201 |
| 2012/0296998 A1* | 11/2012 | Pope | H04L 67/10 709/206 |
| 2013/0155948 A1* | 6/2013 | Pinheiro | H04W 76/10 370/328 |
| 2013/0269022 A1* | 10/2013 | Zhang | H04L 63/1466 726/13 |
| 2013/0329557 A1* | 12/2013 | Petry | H04W 28/065 370/235 |

(56) References Cited

U.S. PATENT DOCUMENTS

| | | | | |
|---|---|---|---|---|
| 2014/0330976 A1* | 11/2014 | van Bemmel | .......... | H04L 69/16 |
| | | | | 709/226 |
| 2014/0330977 A1* | 11/2014 | van Bemmel | .......... | H04L 47/34 |
| | | | | 709/226 |
| 2015/0121490 A1* | 4/2015 | Liu | .................. | H04W 12/0471 |
| | | | | 726/6 |
| 2015/0131447 A1* | 5/2015 | Petry | .................. | H04L 63/0428 |
| | | | | 370/235 |
| 2015/0201007 A1* | 7/2015 | Pope | ....................... | G06F 9/546 |
| | | | | 709/201 |
| 2016/0028547 A1* | 1/2016 | Yao | ....................... | H04L 9/0825 |
| | | | | 713/176 |
| 2016/0212507 A1* | 7/2016 | Du | .......................... | H04Q 9/00 |
| 2016/0246657 A1* | 8/2016 | Pope | ..................... | H04L 69/162 |
| 2016/0255064 A1* | 9/2016 | Naslund | ................ | H04L 9/0816 |
| | | | | 726/3 |
| 2017/0034847 A1* | 2/2017 | He | ......................... | H04W 76/15 |
| 2017/0111953 A1* | 4/2017 | Rautiola | ............. | H04L 61/6054 |
| 2017/0149935 A1* | 5/2017 | van Bemmel | ........ | H04L 67/142 |
| 2017/0325733 A1* | 11/2017 | Hettrick | ................. | G16H 50/30 |
| 2018/0145894 A1* | 5/2018 | Zhou | ...................... | H04L 45/70 |
| 2018/0213575 A1* | 7/2018 | Chen | ...................... | H04W 76/27 |
| 2018/0255573 A1* | 9/2018 | He | ......................... | H04W 74/06 |
| 2018/0278625 A1* | 9/2018 | Cammarota | .......... | H04L 63/162 |
| 2019/0149329 A1* | 5/2019 | Wu | .......................... | H04L 9/14 |
| | | | | 713/155 |
| 2019/0208419 A1* | 7/2019 | Phan | ..................... | H04L 9/3234 |
| 2019/0245801 A1* | 8/2019 | Zhou | ....................... | G06F 13/20 |
| 2019/0246272 A1* | 8/2019 | Richard | ................ | H04L 9/3242 |
| 2019/0281495 A1* | 9/2019 | Wu | ................ | H04L 45/66 |
| 2019/0334861 A1* | 10/2019 | Xu | .......................... | H04L 61/25 |
| 2020/0218587 A1* | 7/2020 | Pope | .................. | G06F 9/30181 |
| 2020/0345289 A1* | 11/2020 | Hettrick | ............. | A61N 1/36017 |
| 2021/0051736 A1* | 2/2021 | Jeon | ...................... | H04W 76/11 |
| 2021/0112563 A1* | 4/2021 | Hua | ................... | H04W 72/042 |
| 2021/0144742 A1* | 5/2021 | Jeon | ................. | H04W 72/1289 |

FOREIGN PATENT DOCUMENTS

| | | |
|---|---|---|
| WO | 2007102702 A2 | 9/2007 |
| WO | 2016137374 A1 | 9/2016 |

OTHER PUBLICATIONS

English translation of the International Written Opinion dated Nov. 24, 2017 for corresponding International Application No. PCT/FR2017/052695, filed Oct. 2, 2017.

International Preliminary Report on Patentability and English translation of Written Opinion of the International Searching Authority dated Apr. 9, 2019 for corresponding International Application No. PCT/FR2017/052695, filed Oct. 2, 2017.

* cited by examiner

METHOD FOR MUTUAL AUTHENTICATION BETWEEN USER EQUIPMENT AND A COMMUNICATION NETWORK

CROSS-REFERENCE TO RELATED APPLICATIONS

This application is a Section 371 National Stage Application of International Application No. PCT/FR2017/052695, filed Oct. 2, 2017, the content of which is incorporated herein by reference in its entirety, and published as WO 2018/065712 on Apr. 12, 2018, not in English.

FIELD OF THE DISCLOSURE

The present invention relates to the field of access to a communication network, and more particularly the security of authentication during access to this network.

BACKGROUND OF THE DISCLOSURE

Within the framework of mobile networks of 3G and 4G type, the "3GPP" ("Third Generation Partnership Project") organization has defined protocols intended to guarantee the security of a client's access to a mobile network. In particular, the "UMTS AKA" (from the English "Universal Mobile Telecommunications System" and "Authentication and Key Agreement") protocol and "EPS AKA" (for "Evolved Packet System") protocol describe mutual authentication and the establishment of session keys intended to ensure the confidentiality and integrity of data exchanged between the client and the mobile network during access to the network.

The AKA protocols thus define exchanges of a mutual authentication between the network and the client. The authentication rests upon the fact that the client, more precisely a security element (or "Secure Element"), for example a UICC/USIM (for "Universal Integrated Circuit Card/Universal Subscriber Identity Module") card included in a client equipment such as a mobile terminal, and the network share the knowledge of one and the same secret key, customarily named "authentication key K" which is used to generate authentication vectors used during authentication, and to derive keys such as keys for radio pathway encryption and integrity control.

It is understood that the compromising of a secret key such as this, shared by the client and the network, jeopardizes the security of the mobile network. The authentication key K may thus be compromised, for example in the case of poorly implemented UICC/USIM cards or of security flaws at card stuffers whose role is to embed these keys into UICC/USIM cards, or by unscrupulous clients. A consequence of such compromising may be the creation of UICC/USIM card clones, the use of a cloned card then making it possible to pass oneself off as a legitimate subscriber. Under particular conditions of use, which necessitate in-depth knowledge about the cryptographic algorithms used and the interception of a random during access to the network, it is also possible to intercept communications.

SUMMARY

One of the aims of the invention is to remedy inadequacies/drawbacks of the prior art and/or to afford improvements thereto.

To this end, the invention proposes a method of mutual authentication between a user equipment and a communication network, said network comprising a mobility management entity and a subscriber server, said method, implemented by the user equipment, comprising:

reception of an authentication challenge comprising an authentication token, which is a function of a first index and of a first authentication message calculated by the subscriber server and which is a function of a first sequence number, verification that one of the conditions belonging to a set of conditions is true, said set of conditions comprising:
the first sequence number is identical to a second sequence number stored in the user equipment, and
the first sequence number is identical to the previous value of the second sequence number and the first index is strictly greater than a second index stored in the client equipment, calculation and sending, when one of the conditions is true, of an authentication result and of an authentication message, which is a function of the previous value of the second sequence number, said authentication result being intended to be satisfied in order to authenticate the user equipment.

The method of mutual authentication described here makes it possible to strengthen the security of the mobile network. Indeed, in case of compromise of a master secret key called the "authentication key K", shared by the user equipment and the network, more precisely the subscriber server, and used to calculate the authentication token AUTN and a set of cryptographic data such as session keys, an attacker who had cloned a user equipment, more precisely a security element of the user equipment, could not use this clone to pass himself off as a legitimate subscriber. Indeed, the attacker cannot immediately obtain the sequence number of the server or of the client, necessary during a network access session in order to be sure of synchronization between the two equipments. The authentication token which is transmitted across the network no longer transports the sequence number of the network masked by an anonymization key generated on the basis of the authentication key K, as is described for example in the specification TS 33.102. Instead it transports only an authentication message calculated on the basis of this sequence number. It is therefore impossible for the attacker to obtain the sequence number.

Moreover, a new value, called the index, has been introduced during the generation of authentication tokens. Such an index, managed at the level of the subscriber server and at the level of the user equipment, makes it possible to detect desynchronizations between the sequence numbers managed respectively at the level of the subscriber server and at the level of the user equipment. It is moreover advantageously used to spontaneously resynchronize the subscriber server and the user equipment. "Spontaneously" signifies that explicit resynchronization commands need no longer be sent by the user equipment in case of desynchronization.

Thus, it is no longer possible for an attacker to trace a user equipment in the network on the basis of resynchronization commands that it would send subsequent to a desynchronization with the network. Such traceability is not admissible in a context of respect for privacy and therefore constitutes a problem of security in the mobile network.

In a first exemplary embodiment, corresponding to the case where the first sequence number is identical to the second sequence number, the method comprises:
incrementation of the second sequence number, and
reinitialization of the second index.

In this example, the user equipment and the subscriber server are synchronized. The security element, which calculates and sends the authentication result subsequent to the reception of the authentication token then increments the second sequence number that it manages. This incrementation is representative of the sending of the authentication result to the mobility management entity.

In a second exemplary of embodiment, corresponding to the case where the first sequence number is identical to the previous value of the second sequence number and the first index is strictly greater than a second index stored in the client equipment, the method comprises:

storage in the second index of the first index.

This example corresponds to the case where the user equipment and the subscriber server are desynchronized by one step. Such desynchronization follows the loss of a message during the establishment of a previous session. For example, an authentication response sent by the user equipment has not been received by the mobility management entity or the authentication message sent by the mobility management entity to the subscriber server has been lost. In this case, the sequence number is not incremented by the user equipment and the second index is updated as a function of the first index. The first and the second index thus give an indication of the number of uncompleted authentications. Note that with this example, the desynchronization of the sequence number remains by one step, irrespective of the number of uncompleted authentications.

The above two examples which correspond to the two conditions verified by the user equipment, allow the latter to detect a desynchronization and to as it were place itself on standby awaiting a resynchronization of the subscriber server. Thus, the resynchronization no longer follows an explicit request, following the detection of a desynchronization, and no longer involves the sending by the user equipment of a sequence number that must be stored by the subscriber server. Such resynchronization requests can be detected by an attacker who can then trace a user equipment by forcing desynchronizations. Such traceability is not desirable in a mobile telecommunications network.

Thus the method of mutual authentication described here no longer allows an attacker to trace a user equipment by tracking the resynchronization requests since these requests are no longer warranted.

The invention also pertains to a method of mutual authentication between a user equipment and a communication network, said network comprising a mobility management entity and a subscriber server, said method, implemented by the subscriber server comprising:

reception of an authentication data request, calculation and sending to the mobility management entity of an authentication datum comprising an expected authentication result and an authentication token, said authentication token being a function of an index and of a first authentication message which is a function of a first sequence number, reception of a second authentication message, which is a function of the previous value of a second sequence number stored in the user equipment, calculation of a second authentication message by means of the first sequence number and comparison of the first and of the second authentication message, mutual authentication being successful when the two authentication messages are equal.

In an exemplary embodiment, the method comprises, when authentication is successful:

incrementation of the first sequence number, and
reinitialization of the index.

The invention also relates to a method of mutual authentication between a client equipment and a telecommunications network, said network comprising a mobility management entity and a subscriber server, said method, implemented by the mobility management entity comprising:

sending of an authentication data request, reception of an authentication datum originating from the subscriber server, said authentication datum comprising an expected authentication result which is a function of a first sequence number, and an authentication token, said authentication token being a function of an index and of a first authentication message which is a function of a first sequence number, sending of the authentication token included in the authentication datum to the user equipment, reception, originating from the user equipment, of an authentication result and of an authentication message, said authentication message being a function of a previous value of a second sequence number stored by the user equipment, sending of the authentication message to the authentication server when the authentication result received from the client equipment is equal to the expected authentication result received from the server.

The invention also pertains to a user equipment of a telecommunications network, said network comprising a mobility management entity and a subscriber server, comprising:

reception means, designed to receive an authentication challenge comprising an authentication token, the authentication token being a function of a first index and of a first authentication message calculated by the subscriber server and which is a function of a first sequence number, verification means, designed to verify that one of the conditions belonging to a set of conditions is true, said set of conditions comprising:

the first sequence number is identical to a second sequence number stored in the user equipment, and the first sequence number is identical to the previous value of the second sequence number, and the first index is strictly greater than a second index stored in the client equipment, calculation and sending means, designed to calculate and send, when one of the conditions is true, an authentication result and an authentication message, which is a function of the previous value of the second sequence number, said authentication result being intended to be satisfied in order to authenticate the user equipment.

The invention also relates to a program for a user equipment, comprising program code instructions intended to control the execution of the steps of the previously described method of mutual authentication and implemented by the user equipment, when the program is executed on said user equipment.

The invention also relates to a subscriber server in a telecommunications network, said network comprising a user equipment and a mobility management entity, comprising:

first reception means, designed to receive an authentication data request, calculation and sending means, designed to calculate and send to the mobility management entity an authentication datum comprising an expected authentication result, an authentication token, said authentication token being a function of a first index and of a first authentication message which is a function of a first sequence number, second reception means, designed to receive a second authentication message, originating from the user equipment and transmitted by the mobility management entity, which is a function of the previous value of a second sequence number stored in the user equipment, calculation and comparison means, designed to calculate a second authentication message by means of the first sequence number and to compare the first and the second authentication message, mutual authentication being successful when the two authentication messages are equal.

The invention also pertains to a program for a subscriber server, comprising program code instructions intended to control the execution of the steps of the previously described method of mutual authentication and implemented by the subscriber server, when the program is executed on said server.

The invention also pertains to a mobility management entity for managing mobility in a telecommunications network, said network comprising a client equipment and a subscriber server, comprising:

first sending means, designed to send an authentication data request, first reception means, designed to receive an authentication datum originating from the subscriber server, said authentication datum comprising an expected authentication result which is a function of a first sequence number and an authentication token, said authentication token being a function of an index and of a first authentication message which is a function of a first sequence number, second sending means, designed to send the authentication token included in the authentication datum to the user equipment, second reception means, designed to receive originating from the user equipment, an authentication result and an authentication message, said authentication message being a function of a previous value of a second sequence number stored by the user equipment, third sending means, designed to send the authentication message to the authentication server when the authentication result received from the client equipment is equal to the expected authentication result received from the server.

The invention also pertains to a program for a mobility management entity, comprising program code instructions intended to control the execution of the steps of the previously described method of mutual authentication and implemented by the mobility management entity, when the program is executed on said entity.

The invention also relates to an authentication system in a telecommunications network, comprising:

at least one user equipment such as described previously, a subscriber server such as described previously, and a mobility management entity such as described previously.

BRIEF DESCRIPTION OF THE DRAWINGS

Other characteristics and advantages of the present invention will be better understood from the description and the appended drawings among which.

DETAILED DESCRIPTION OF ILLUSTRATIVE EMBODIMENTS

The steps of a protocol for mutual authentication between a user equipment and a mobile network, according to an exemplary embodiment, will now be described in conjunction with FIG. 1.

A user (not represented in FIG. 1) is equipped with a user equipment UE designed to access a mobile network. The user equipment UE customarily comprises a terminal and a security element (or "Secure Element"), for example a UICC/USIM (for "Universal Integrated Circuit Card/Universal Subscriber Identity Module") card. Such a security element is designed to store and process sensitive data, for example an application for access to the network and associated data (one speaks of "credentials" in English), such as cryptographic keys and algorithms. Such data are intended to be used by a protocol for mutual authentication with the network during access to the latter. The invention is not limited to a user equipment of this type and in another exemplary embodiment, the user equipment UE comprises a secure software area designed to process the network access sensitive data.

The architecture of the mobile network and the method of mutual authentication are illustrated here within the framework of a network of "EPS" (for "Evolved Packet System") type. The invention is however not limited to this type of network and also applies to other types of mobile networks such as for example the "GPRS" (from the English "General Packet Radio Service") network, or "UMTS" (from the English "Universal Mobile Telecommunications System") network.

A base station eNB is designed to manage radio transmission and reception with the user equipment UE. The user equipment UE is for example a smartphone, a mobile telephone, a tablet, etc.

A mobility management entity MME is, in a conventional manner, responsible for control in an "EPC" ("Evolved Packet Core") network. It is in charge among other things of the management of the signaling of the network and of the user equipment UE, of the establishment of the connections, of the management of the mobility of the user equipment UE and of the authentication of the user equipment UE on the basis of data obtained from a subscriber server HSS (or "AuC" for "Authentication Center"). The management of mobility, or handover, may involve several mobility management entities, including a previous entity, denoted old_MME in FIG. 1, involved during the establishment of a previous network access session on the basis of the user equipment UE. A session is said to have been established provided that a mutual authentication between the user equipment UE and the network has proceeded successfully.

A service gateway S-GW (for "Serving GateWay") is designed to route IP packets between the user equipment UE and the network core and a packet gateway P-GW (for "Packet Data Network Gateway") is designed to provide connectivity to external networks. An identities registration network entity "EIR" (for "Equipment Identity Register") is designed to store security and identification information relating to mobile terminals. It is by virtue of this entity that an operator can block a stolen mobile equipment. Finally, a management entity PCRF (from the English "Policy and Charging Rules Function") is in charge of the management and of the real-time control of a session and offers a payment and billing interface. The functions of the service gateway S-GW, of the packet gateway P-GW, of the registration entity EIR, of the management entity PCRF, the conventional functions of the mobility management entities MME and old_MME and the interfaces between the various entities are described in detail in the specification TS 23.401. The service gateway S-GW, packet gateway P-GW, the registration entity EIR and the management entity PCRF are not represented in FIG. 1 for readability reasons.

For network access purposes, the user equipment UE stores a master secret key K, called the authentication key, shared with the subscriber server HSS. The authentication key K is intended to be used for generating authentication data and for deriving keys such as session keys. Such session keys are for example intended to be used for the encryption of the radio pathway, for integrity control, etc. More precisely the authentication key K is stored in the security element of the user equipment UE. The user equipment UE stores and also manages a sequence number $SQN_c$, associated with a state of the security element. This state evolves along with the sessions, this being manifested by the incrementation of one step of the sequence number with each established session. Note that the sequence number $SQN_c$ is never reinitialized.

The sequence number $SQN_c$ is customarily used to avoid replay attacks during authentication of user equipment with the network.

Within the framework of the method of mutual authentication described here, the security element of the user equipment UE also stores an index $idx_c$. The index $idx_c$ is intended to avoid certain types of replay attacks in the course of which a challenge would be replayed for one and the same sequence number. The index actually makes it possible to distinguish two authentication tokens calculated with the same sequence number. Moreover, the index makes it possible, at the level of the user equipment UE, to take account of the loss of an authentication response during the establishment of a previous session, and which has caused a desynchronization of the sequence numbers between the subscriber server HSS and by the user equipment UE. Indeed, the subscriber server HSS does not increment its sequence number if it has not received and validated the authentication response. It also makes it possible for the two entities to be resynchronized during a following session without explicitly sending the sequence number. This makes it possible to circumvent the resynchronization requests which form the subject of an explicit command exchanged between the two entities and which, when they are detected by an attacker, may make it possible to trace a user equipment in the network.

For each subscriber that it manages, for example for the user equipment UE, the subscriber server HSS stores a triple comprising the authentication key K of the subscriber, a sequence number $SQN_{Op,c}$ and an index $idx_{Op,c}$. Note that in case of normal operation of the network, that is to say with no message loss during the establishment of sessions, the sequence number $SQN_{Op,c}$ and the index $idx_{Op,c}$ which are stored in association with the user equipment UE and managed by the subscriber server HSS are identical to the sequence number $SQN_c$ and to the index $idx_c$ which are stored and managed by the user equipment UE. A difference between the values stored and managed by the user equipment UE and those stored by the authentication server HSS is representative of the loss of at least one message during the establishment of a session.

Certain exchanges described hereinbelow comply with those of the procedure for registering a mobile terminal in a network, such as described in the specification TS 23.401, paragraph 5.3.2.1. In particular, the messages exchanged, when they have the same name, as well as their parameters, are identical to those of the specification. They are therefore not described in detail.

In an initial step E0, the UE terminal sends a request for attachment to the network Attach Request. The request is received by the base station eNB and retransmitted in a step E1 of retransmission to the mobility management entity MME.

The attachment request comprises an identifier of the UE terminal. This identifier is either a temporary identifier of "GUTI" (for "Globally Unique Temporary Identifier") type, if it possesses one, or a permanent subscriber identifier, or "IMSI" (for "International Mobile Subscriber Identity"), stored in the security element of the user equipment UE. If the user equipment UE possesses a temporary identifier, the latter has been assigned to it during a previous attachment of the user equipment UE to the network by the previous mobility management entity old_MME. In another exemplary embodiment, corresponding to a UMTS network, the temporary identifier is of "TMSI" ("Temporary Mobile Subscriber Identity") type.

If the user equipment UE has identified itself with a temporary identifier, then in a step E2 of sending, the mobility management entity MME sends an identification request, Identification Request, destined for the previous mobility management entity old_MME which has allocated the temporary identifier to the client equipment UE previously. The previous mobility management entity old_MME sends, in a step E3 of response, an identification response, Identification Response, to the mobility management entity MME. The identification response comprises a context specific to the user equipment UE which comprises the unique subscriber identifier IMSI with which the temporary identifier has been associated, as well as security information.

In a case where the previous step has failed, that is to say in the case where the user equipment UE was unknown to the previous mobility management entity old_MME, the mobility management entity MME sends an identity request, Identity Request, to the user equipment UE via the base station eNB in a sending step E4. This request is intended to obtain the unique subscriber identifier IMSI from the user equipment UE. The user equipment UE responds to this request in a response step E5, by sending a response to the identity request, Identity Response, which comprises the IMSI, to the mobility management entity MME. Steps E2, E3, E4 and E5 being optional, since they are executed only when the user equipment UE is unknown to the mobility management entity MME, they appear dashed in FIG. 1.

At this juncture, the mobility management entity MME possesses the unique subscriber identifier IMSI associated with the user equipment UE.

In a following sending step E6, the mobility management entity MME sends an authentication data request, Authentication Data Request, to the subscriber server HSS. The authentication data request comprises the identifier IMSI of the client equipment UE, as well as an identifier of the visited network $VPLMN_{id}$. The visited network VPLMN (from the English "Visited Public Land Mobile Network") is that from which the user equipment UE accesses the network in the course of the current session. The mobility management entity MME which receives the attachment request sent by the user equipment UE is an entity of the visited network of identifier $VPLMN_{id}$.

In a step E7 of generating and sending authentication data, the subscriber server HSS identifies in its subscriber base, on the basis of the identifier IMSI of the user equipment UE, the authentication key K, knowledge of which it shares with the user equipment UE, the sequence number $SQN_{Op,c}$ and the index value $idx_{Op,c}$ such as are stored by the network. The subscriber server HSS thereafter generates an authentication datum AV which comprises: an authentication token AUTN, an expected authentication response XRES, a random R and a master session key MSK. The master session key MSK is intended to be used to derive session keys such as keys for radio pathway encryption and integrity control for a current session. The authentication token AUTN is intended to be used for the authentication of the network by the user equipment UE. The expected response XRES corresponds to the value that the user equipment UE must respond with to the mobility management entity MME subsequent to the sending by the latter of the authentication token AUTN and of the random R. Finally, the random R, generated by the subscriber server HSS, is intended to avoid replays of authentication data from the user equipment of an attacker. The authentication datum is therefore of the form: AV=(AUTN, XRES, R, MSK).

More precisely, the following values, intended to be used to generate the authentication datum AV are calculated by the subscriber server HSS:

An encrypt $C_{idx}$ of the index $idx_{Op,c}$ stored by the subscriber server HSS: $C_{idx}=Enc_K(R, idx_{Op,c})$, where $Enc_K$ is a symmetric encryption algorithm parametrized by the authentication key K specific to the user equipment UE. The symmetric encryption algorithm is for example the "AES" (from the English "Advanced Encryption Standard") algorithm;

a first authentication message $MAC_1=H_1(K, R, SQN_{Op,c}, VPLMN_{id}, AMF)$, where $H_1$ is a hash function with secret key, $VPLMN_{id}$ (from the English "Visited Public Land Mobile Network") an identifier specific to the visited network in which the user equipment UE is situated, and AMF (from the English "Authentication Management Field") a network parameter included in each authentication datum and interpretable by the security element and the mobile equipment;

$XRES=H_2(K, R, SQN_{op,c}, VPLMN_{id}, AMF)$, where $H_2$ is a hash function with secret key;

$CK=H_3(K, R, SQN_{op,c}, VPLMN_{id}, AMF)$, where $H_3$ is a hash function with secret key.

The key CK is a first intermediate key making it possible to calculate the key MSK. It is intended to be also calculated by the user equipment UE;

$IK=H_4(K, R, SQN_{op,c}, VPLMN_{id}, AMF)$, where $H_4$ is a hash function with secret key. The key IK is a second intermediate key intended to be also calculated by the user equipment UE;

$MSK=KDF(CK, IK, VPLMN_{id})$, where KDF is a keys derivation function intended to be used to obtain a plurality of session keys, for example a radio pathway encryption key, an integrity control key, etc.; and $AUTN=(MAC_1, AMF, C_{idx})$.

At the end of step E7, the subscriber server HSS sends the authentication datum AV generated, as well as the identifier IMSI of the user equipment UE to the mobility management entity MME. It also increments its index $idx_{Op,c}$ by one step. For example, $idx_{Op,c}=idx_{Op,c}+1$. The incrementation is representative of the sending of the authentication datum AV by the subscriber server HSS.

In a step E8 of generating keys and of sending an authentication challenge, the mobility management entity MME derives the key MSK so as to generate the first CK and the second IK intermediate key specific to the user equipment UE. At the end of step E8, the mobility management entity MME sends to the UE client terminal via the base station eNB an authentication challenge, Authentication Challenge, which comprises the authentication token AUTN received from the subscriber server HSS and the random R. The authentication challenge is denoted (AUTN, R).

In a following calculation and verification step E9, the user equipment UE calculates a second and a third authentication message $MAC_2$, $MAC_3$, on the basis of the random R received and of data that it has stored.

Thus, the second authentication message $MAC_2=H_1(K, R, SQN_c, VPLMN_{id}, AMF)$, where $H_1$ is the hash function with secret key used by the subscriber server HSS during the generation of the authentication datum, is calculated on the basis of the current sequence number $SQN_c$ stored by the user equipment UE.

The third authentication message $MAC_3=H_1(K, R, SQN_c^{-1}, VPLMN_{id}, AMF)$ is calculated on the basis of a previous sequence number, denoted $SQN_c^{-1}$. The previous sequence number $SQN_c^{-1}$ is the value that the current sequence number had during the previous established session, that is to say associated with a successful mutual authentication. In an exemplary embodiment, the sequence number $SQN_c$ is a discrete integer value. The previous sequence number $SQN_c^{-1}$ can therefore be calculated by removing "1" from the current sequence number. In another exemplary embodiment, a current sequence number $SQN_c$ is obtained by applying a function f to the previous sequence number; in this case, the previous sequence number $SQN_c^{-1}$ can be stored, or calculated by means of an inverse function $f^{-1}$.

The user equipment UE also decrypts the index $C_{idx}$ that it has received encrypted in the authentication token AUTN. It thus obtains the index $idx_{Op,c}$ such as sent in the authentication datum by the subscriber server HSS.

The user equipment UE thereafter verifies whether one of the following two conditions is true:

either that the first authentication message $MAC_1$ received in the authentication token AUTN in the course of step E8 is identical to the second authentication message $MAC_2$ that the user equipment UE has calculated. Stated otherwise, it verifies that:

$$MAC_2=H_1(K,R,SQN_c,VPLMN_{id},AMF)=MAC_1 \qquad (1)$$

or that the first authentication message $MAC_1$ received in the authentication token AUTN in the course of step E8 is equal to the third authentication message $MAC_3$ that the user equipment UE has calculated on the basis of the previous sequence number $SQN_c^{-1}$, and that the index $idx_c$ that it stores is less than the index $idx_{Op,c}$ that it has received encrypted and that it has decrypted previously.

Stated otherwise, the user equipment UE verifies that:

$$MAC_3=H_1(K,R,SQN_c-1,VPLMN_{id},AMF)=MAC_1$$
$$AND\ idx_c<idx_{Op,c} \qquad (2)$$

If neither of the conditions is satisfied ("nok" branch in FIG. 1), indicating that the authentication of the network by the user equipment UE has failed, the method stops in an end step E10.

Figure 1:
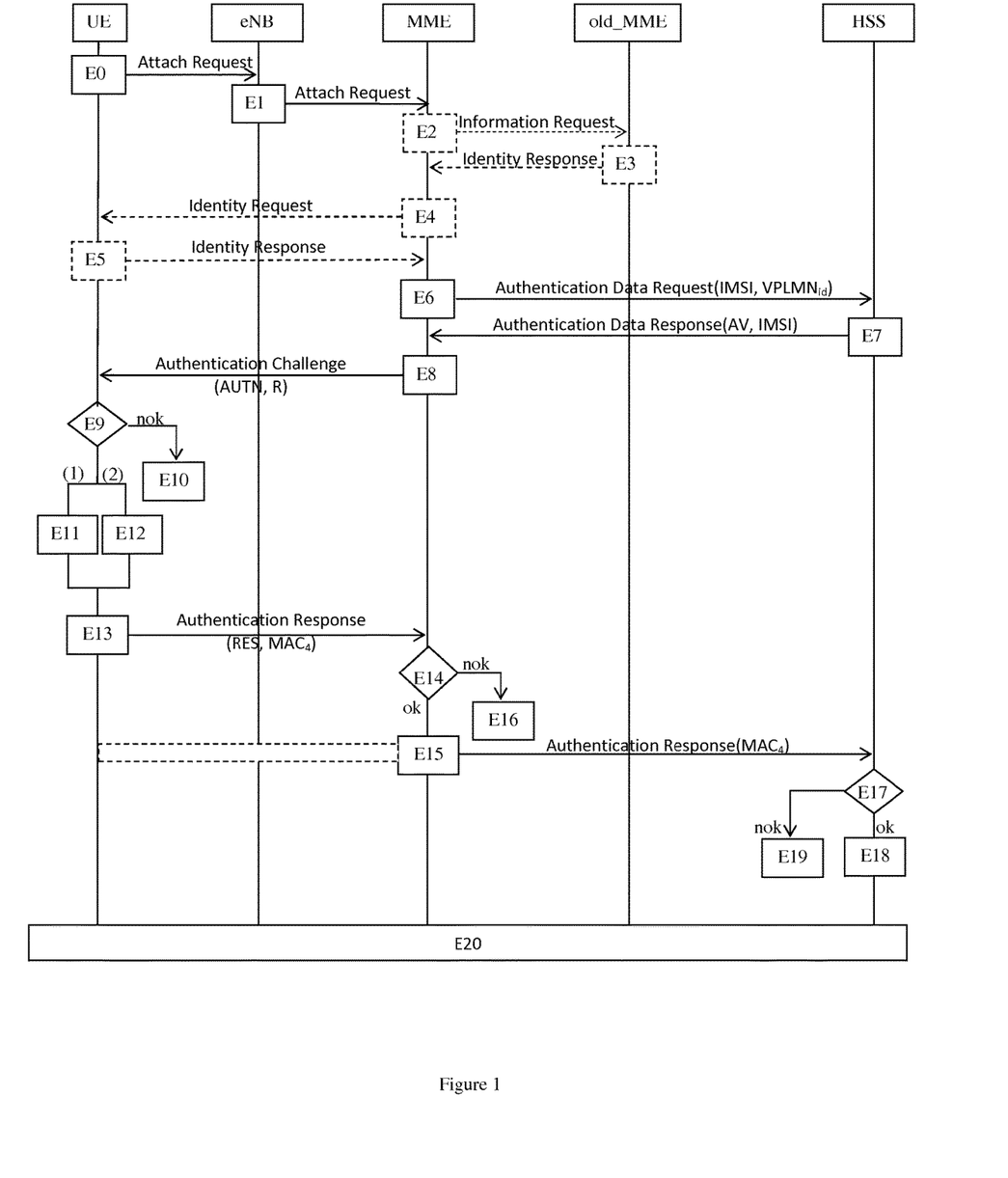
FIG. 1 presents the steps of an authentication method, according to an exemplary embodiment.

If the first condition is true (branch '(1)' in FIG. 1), that is to say if $MAC_2=MAC_1$, the sequence numbers $SQN_c$, $SQN_{Op,c}$, managed respectively by the subscriber server HSS and by the user equipment UE are identical. This signifies that the network, more precisely the subscriber server HSS and the user equipment UE are synchronized. Stated otherwise there has been no message loss during the establishment of the previous session, the mutual authentication has been a success. In this case, in an updating step E11, the user equipment UE reinitializes its index $idx_c$ and increments its sequence number $SQN_c$. For example, $idx_c=0$ and SQNc=SQNc+1.

If the second condition is true (branch '(2)' in FIG. 1), this signifies that there has been a message loss during the establishment of a previous session, the mutual authentication has failed. More precisely, either the message sent from the user equipment UE to the mobility management entity MME via the base station eNB has been lost, or the authentication message transmitted from the mobility management entity MME to the subscriber server HSS has been lost. The session has therefore not been established.

In this case, in an updating step E12, the user equipment UE updates its index $idx_c$ by assigning it the value, decrypted in the course of step E9, of the index of the authentication server $idx_{Op,c}$.

In a following calculation and sending step E13, the user equipment UE calculates an authentication result RES and a fourth authentication message $MAC_4$:

RES=$H_2$(K, R, $SQN_c^{-1}$, $VPLMN_{id}$, AMF); note that this authentication result is calculated either after the user equipment UE has incremented its sequence number $SQN_c$ in the course of step E11, or after a difference of one step has been detected between $SQN_c$ and $SQN_{Op,c}$. In both cases, the sequence number $SQN_c$ managed by the user equipment UE and used to calculate the authentication result RES is one step in advance of the sequence number $SQN_{Op,c}$ managed by the subscriber server;

$MAC_4=H_6$(K, R, $SQN_c^{-1}$, $VPLMN_{id}$, AMF), where $H_6$ is a hash function with secret key. Note that at this juncture, the user equipment UE has authenticated the network. The fourth authentication message $MAC_4$, intended to be verified by the subscriber server HSS, makes it possible to confirm the authenticity of the user equipment UE to the subscriber server HSS independently of the mobility management entity. This confirmation conditions the incrementation of the sequence number $SQN_{Op,c}$ by the subscriber server HSS.

The authentication result RES and the fourth authentication message $MAC_4$ are sent in an authentication response message, Authentication Response, to the mobility management entity MME via the base station eNB at the end of step E13.

In a verification step E14, the mobility management entity MME compares the authentication result RES received from the user equipment UE with the expected result XRES received from the subscriber server HSS in the course of step E7. In a first case ('ok' branch in FIG. 1) where the two values are equal, indicating that the authentication of the user equipment UE with the network has succeeded, in an establishment and sending step E15, the mobility management entity MME establishes a secure channel with the user equipment UE within the framework of following exchanges, not described, and sends the fourth authentication message $MAC_4$ to the subscriber server HSS in an authentication response message, Authentication Response. In a second case ('nok' branch in FIG. 1) where the authentication result RES is not equal to the expected authentication result XRES, indicating that the authentication of the user equipment UE with the network has failed, the method terminates in an end step E16.

In a following verification step E17, the subscriber server HSS verifies the fourth authentication message $MAC_4$ that it has received in the course of step E15. To this end, it calculates a control authentication message $MAC_4'$ on the basis of its sequence number $SQN_{Op,c}$, in the following manner:

$MAC_4'=H_6(K,R,SQN_{Op,c},VPLMN_{id},AMF)$

It thereafter compares the calculated value with that of the fourth authentication message $MAC_4$.

In a first case ('ok' branch in FIG. 1) where the values are equal, the authentication of the user equipment UE is accepted. In a following updating step E18, the authentication server increments its sequence number $SQN_{Op,c}$ and reinitializes its index $idx_{Op,c}$. In this example the sequence number $SQN_{Op,c}$ is updated with the value $SQN_{Op,c}+1$ and its index $idx_{Op,c}$ is reset to zero.

In a second case ('nok' branch in FIG. 1) where the values differ, indicating that the authentication of the user equipment has failed, the method terminates in an end step E19. Note that in this case the sequence number $SQN_{Op,c}$ and the index $idx_{Op,c}$ are not modified.

The registration procedure continues thereafter, in accordance with steps 5b to 26 of the registration procedure described in the specification TS 23.401, involving the service gateway S-GW and the packet gateway P-GW, the registration entity EIR and the management entity PCRF, which are not represented in FIG. 1.

The execution of these steps of the registration procedure is represented in the figure by step E28.

In an exemplary embodiment, the hash functions with secret key, denoted $H_1$ to $H_6$, used to calculate the authentication messages $MAC_1$, $MAC_2$, $MAC_3$, $MAC_4$, the expected authentication result XRES, the first and second intermediate keys CK, IK are a part of a set of standardized functions such as Millenage, or Tuak.

Note that the use of the identifier of the visited network $VPLMN_{id}$ to calculate the authentication messages, the expected authentication result XRES, the first and second intermediate keys CK, IK makes it possible to prevent replaying, in a network, authentication vectors generated for another network.

With the method described here, there is never an offset of greater than one step between the sequence numbers managed respectively by the user equipment UE and the subscriber server HSS. The sequence number managed by the user equipment UE is incremented only when it is equal to the sequence number managed by the subscriber server HSS. Note that the verification of such equality, based on the verification of authentication messages calculated on the basis of one-way functions, is done without the subscriber server HSS and the user equipment UE exchanging their current sequence number. The subscriber server HSS increments its sequence number only after reception of the fourth authentication message $MAC_4$ which allows the subscriber server HSS to be sure of the authenticity of the user equipment UE. It is therefore not incremented in case of message loss between the user equipment UE and the subscriber server HSS. In this case, an offset of one step may occur, the sequence number of the user equipment UE then being one step in advance with respect to the sequence number of the subscriber server HSS. This offset is then processed for a current session by maintaining the sequence number of the user equipment UE at the value that it had during the previous session and by acting on the index so as to differentiate a current session from the previous session. Thus, the two equipments resynchronize automatically in the course of the successful establishment of a session, without any explicit request for resynchronization, as is the case currently.

Indeed, customarily, when a desynchronization of the sequence numbers occurs, a resynchronization mechanism is implemented by way of resynchronization request. During this resynchronization, the user equipment UE sends its sequence number to the subscriber server HSS so that the latter resynchronizes with the user equipment UE. Such a resynchronization mechanism makes it possible to trace a user equipment by detecting the sending of the resynchronization request. However, a user equipment must not be traceable, that is to say it must not be possible to link two different accesses to the network from one and the same user equipment. If, moreover, an attacker succeeds in obtaining the identity of the custodian subscriber who owns the user equipment UE, or an identifier of the equipment, involved in the resynchronization requests, this undermines the privacy of the user and constitutes a serious security problem.

The indices $idx_c$ and $idx_{Op,c}$, managed respectively by the user equipment UE and the subscriber server HSS make it possible to distinguish two successive authentication tokens calculated on the basis of one and the same sequence number. Indeed, the establishment of a session based on a first authentication token calculated and sent by the subscriber server HSS might not succeed. For example, a message, for example the authentication response of the user equipment UE, may get lost or be compromised. Authentication fails and, in this case, the sequence number of the subscriber server is not incremented. A new token is generated during the establishment of the following session, it is generated on the basis of the same sequence number. The index $idx_{Op,c}$, incremented by the subscriber server HSS at the start of the establishment of the session and transmitted encrypted to the user equipment UE thus allows the user equipment UE to be sure that the new authentication token is different from that used during the previous session. Thus, the management of an index, in addition to the management of the sequence numbers, guarantees that there is never a difference of more than one step between sequence numbers managed respectively by the user equipment UE, since a sequence number is reused in the case of a failure of authentication. For all that, the use of one and the same sequence number during the establishment of two successive sessions gives rise to two distinct authentication tokens. Thus, even if an authentication key K is corrupted, an attacker cannot obtain the current sequence number of a user equipment or of an authentication server. Indeed, the sequence number no longer has to be transmitted since there is no longer any desynchronization between the items of equipment. Attacks consisting in cloning a card are no longer possible. Thus, attempts to access the network via these cards fail due to ignorance of the sequence number.

Figure 2:
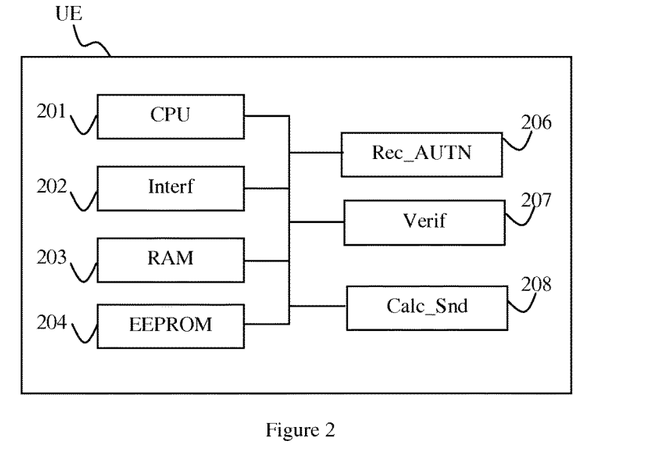
FIG. 2 is a schematic representation of a user equipment, according to an exemplary embodiment.

A user equipment, according to an exemplary embodiment, will now be described, in conjunction with FIG. 2.

A user equipment UE customarily comprises a mobile equipment equipped with a radio interface designed to interface with a mobile communication network, and a security element (or "Secure Element"), for example a UICC/USIM (for "Universal Integrated Circuit Card/Universal Subscriber Identity Module") card. Such a security element is designed to store and process sensitive data, such as cryptographic algorithms and keys. Such data and algorithms are intended to be used by the method of mutual authentication between the user equipment UE and the communication network, such as described in conjunction with FIG. 1. The interactions between the mobile terminal and the security element in the user equipment UE being very tight during a network access of the user equipment UE and for readability reasons, no distinction is made hereinafter between the mobile equipment and the security element, which are thus grouped together in the user equipment UE. Note that the invention is not limited to a user equipment of this type and in another exemplary embodiment, the user equipment UE comprises a secure software area designed to process the network access sensitive data.

In the example described here, the user equipment UE comprises:

a processing unit 201, or "CPU" for "Central Processing Unit", designed to execute code instructions, a radio interface 202, designed to interface with the mobile communication network;

a set of memories, including a volatile memory 203 and a read-only memory of "ROM" type and a storage memory 204 of flash memory type or "EEPROM" (for "Electrically-Erasable Programmable Read Only Memory). The volatile memory 203 is designed to store variables, to store temporary results of executions of instructions, etc. The storage memory 204 is designed to store sensitive applications and data. In particular, the storage memory 204 stores an authentication module designed to implement those of the steps of the previously described method of mutual authentication which are implemented by the user equipment UE. The storage memory 204 also stores an authentication key K, a sequence number $SQN_c$ and an index $idx_c$.

The user equipment UE also comprises:

a reception module 206, designed to receive an authentication challenge comprising an authentication token AUTN, the authentication token being a function of a first index $idx_{Op,c}$ and of a first authentication message $MAC_1$ calculated by the subscriber server HSS (not represented in FIG. 2) and which is a function of a first sequence number $SQN_{Op,c}$. The reception module 206 is designed to implement step E8 of the method of mutual authentication such as described previously;

a verification module 207, designed to verify that one of the conditions belonging to a set of conditions is true, said set of conditions comprising:

a first sequence number $SQN_{Op,c}$ specific to the subscriber server HSS is identical to a second sequence number $SQN_c$ stored in the user equipment, and the first sequence number is identical to the previous value $SQN_c$ of the second sequence number and the first index is strictly greater than a second index $idx_c$ stored in the user equipment UE.

The verification module 207 is designed to implement step E9 of the method of mutual authentication such as described previously;

a calculation and sending module 208, designed to calculate and send, when one of the conditions is satisfied, an authentication result RES and an authentication message $MAC_4$, which is a function of the previous value of the second sequence number, said authentication result being intended to be satisfied in order to authenticate the user equipment UE. The calculation and sending module 208 is designed to implement step E13 of the method of mutual authentication such as described previously.

The modules described hereinabove and especially the reception module 206, the verification module 207 and the of calculation and sending module 208 are preferably software modules comprising software code instructions for executing those of the steps of the mutual authentication method described in conjunction with FIG. 1, and which are implemented by the user equipment UE.

The invention therefore also relates to:
- a computer program comprising instructions for the implementation of the method of mutual authentication such as described previously, when this program is executed by a processor;
- a recording medium readable by a reader on which is recorded the computer program described hereinabove.

The software modules can be stored in, or transmitted by a data medium. The latter can be a hardware storage medium, or else a transmission medium such as a signal or a communications network.

Figure 3:
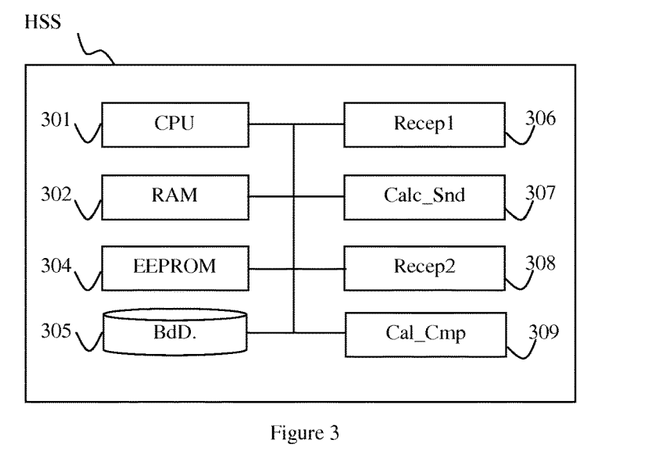
FIG. 3 is a schematic representation of a subscriber server, according to an exemplary embodiment.

A subscriber server, according to an exemplary embodiment, will now be described in conjunction with FIG. 3.

A subscriber server HSS is a computing server designed to manage data in respect of subscribers' access to a communication network. It is also designed to authenticate a user equipment during the latter's access to the network and to authenticate itself with this equipment.

The subscriber server HSS comprises:
- a processing unit or processor 301, intended to load instructions into memory, to execute them and to perform operations;
- a set of memories, including a volatile memory 302, or RAM, used to execute code instructions, to store variables, etc., a read-only memory and a storage memory 304 of EEPROM type. In particular, the storage memory 304 is designed to store a software module comprising code instructions for implementing those of the steps of the method such as described previously of mutual authentication between a user equipment and a communication network which are executed by the subscriber server HSS. The subscriber server HSS is designed to access a subscriber base 305 which comprises data in respect of access to the network specific to each of the subscribers to the network. In particular, for each of the subscribers of the network, the subscriber server HSS stores a triple comprising an authentication key K of the subscriber, a sequence number $SQN_{Op,c}$ and an index $idx_{Op,c}$.

The subscriber server HSS also comprises:
- a first reception module 306, designed to receive an authentication data request. The first reception module 306 is designed to implement step E6 of the method of mutual authentication described in conjunction with FIG. 1;
- a calculation and sending module 307, designed to calculate and to send to the mobility management entity MME an authentication datum AV comprising an expected authentication result XRES, an authentication token AUTN, said authentication token being a function of a first index $idx_{Op,c}$ and of a first authentication message $MAC_1$, which is a function of a first sequence number $SQN_{Op,c}$. The calculation and sending module 307 is designed to implement step E7 of the authentication method described previously;
- a second reception module 308, designed to receive a second authentication message $MAC_4$, originating from the user equipment and transmitted by the mobility management entity, which is a function of the previous value $SQN_c^{-1}$ of a second sequence number stored in the user equipment. The second reception module 308 is designed to implement step E15 of the authentication method described previously;
- a calculation and comparison module 309, designed to calculate a second authentication message $MAC_4'$ by means of the first sequence number $SQN_{Op,c}$ and to compare the first and the second authentication message, mutual authentication being successful when the two authentication messages are equal. The calculation and comparison module 309 is designed to implement step E17 of the authentication method described previously.

The first reception module 306, the calculation and sending module 307, the second reception module 308 and the calculation and comparison module 309 are preferably software modules comprising software instructions for implementing the steps of the method of mutual authentication between a user equipment and a communication network which are executed by the subscriber server HSS.

The invention therefore also relates to:
- a computer program comprising instructions for the implementation of the method of mutual authentication between a user equipment and a network such as described previously when this program is executed by a processor of the subscriber server HSS, and
- a readable recording medium on which is recorded the computer program described hereinabove.

Figure 4:
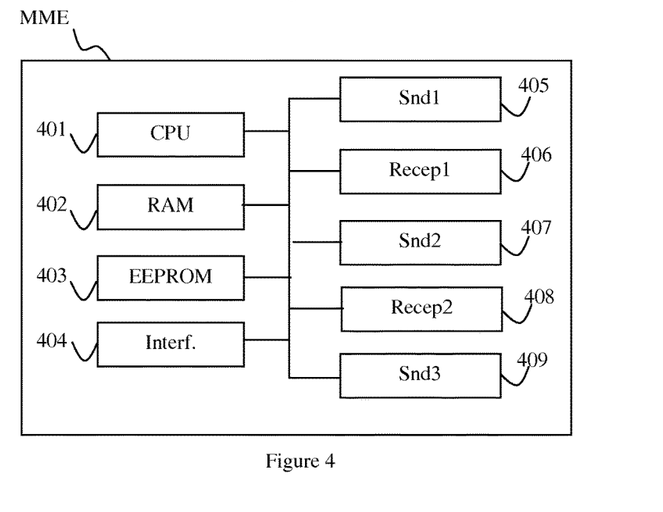
FIG. 4 is a schematic representation of a mobility management entity, according to an exemplary embodiment.

A mobility management entity, according to an exemplary embodiment, will now be described in conjunction with FIG. 4.

A mobility management entity MME is a network entity in charge of control in a mobile communication network. It is responsible for the registration of the various user equipments, for their authentication and for their reachability.

The mobility management entity MME is a computing server comprising:
- a processing unit or processor 401, or CPU, intended to load instructions into memory, to execute them and to perform operations;
- a set of memories, including a volatile memory 402, or RAM used to execute code instructions, to store variables, etc., and a storage memory 403 of EEPROM type. In particular, the storage memory 403 is designed to store a software module comprising code instructions for implementing those of the steps of the method such as described previously of mutual authentication between a user equipment and a communication network which are executed by the mobility management entity MME.

The mobility management entity MME also comprises:
- a set 404 of interfaces, designed to communicate with entities of the network, such as the user equipment UE via the base station eNB, other mobility management entities, the subscriber server HSS;
- a first sending module 405, designed to send an authentication data request to the subscriber server HSS. The first sending module 405 is designed to implement step E6 of the method of mutual authentication between the user equipment and the network such as described previously;
- a first reception module 406, designed to receive an authentication datum originating from the subscriber server HSS, said authentication datum comprising an expected authentication result XRES which is a function of a first sequence number $SQN_{Op,c}$ and an authentication token AUTN, said authentication token being a function of an index $idx_{Op,c}$ and of a first authentication message $MAC_1$ which is a function of a first sequence number $SQN_{Op,c}$. The first reception module is designed to implement step E7 of the method of mutual authentication such as described previously;

a second sending module 407, second sending means, designed to send the authentication token included in the authentication datum to the user equipment. The second sending module 407 is designed to implement step E8 of the method of mutual authentication such as described previously;

a second reception module 408, designed to receive originating from the user equipment, an authentication result RES and an authentication message $MAC_4$, said authentication message being a function of a previous value of a second sequence number $SQN_c$ stored by the user equipment. The second reception module 408 is designed to implement step E13 of the method of mutual authentication such as described previously;

a third sending module 409, designed to send the authentication message to the authentication server when the authentication result received from the client equipment is equal to the expected authentication result received from the server. The third sending module 409 is designed to implement step E15 of the method of mutual authentication such as described previously.

The set of interfaces 404, the first sending module 405, the first reception module 406, the second sending module 407, the second reception module 408 and the third sending module 409 are preferably software modules comprising software instructions for implementing the steps of the method of mutual authentication between a user equipment and a communication network which are executed by the mobility management entity MME.

The invention therefore also relates to:

a computer program comprising instructions for the implementation of the method of registration of a mobile terminal such as described previously when this program is executed by a processor of the mobility management entity MME, and a readable recording medium on which is recorded the computer program described hereinabove.

The invention also pertains to a system for mutual authentication in a communication network. It comprises at least one user equipment UE such as described in conjunction with FIG. 2, a subscriber server HSS such as described in conjunction with FIG. 3 and a mobility management entity such as described in conjunction with FIG. 4. Such a system is designed to implement the steps of the method of mutual authentication such as described previously.

Although the present disclosure has been described with reference to one or more examples, workers skilled in the art will recognize that changes may be made in form and detail without departing from the scope of the disclosure and/or the appended claims.

The invention claimed is:

1. A method of mutual authentication between a user equipment and a communication network, said network comprising a mobility management entity and a subscriber server, said method, implemented by the user equipment, comprising:

receiving an authentication challenge comprising an authentication token, which is a function of a first index and of a first authentication message calculated by the subscriber server and which is a function of a first sequence number, verifying that one of the conditions belonging to a set of conditions is true, said set of conditions comprising:
the first sequence number is identical to a second sequence number stored in the user equipment, and the first sequence number is identical to a previous value of the second sequence number and the first index is strictly greater than a second index stored in the user equipment, when neither of the conditions is true, indicating that the authentication of the network by the user equipment has failed, ending said method, otherwise, when one of the conditions is true, indicating that the network is authenticated by the user equipment, and calculating and sending, an authentication result and an authentication message, which is a function of the previous value of the second sequence number, said authentication result being intended to be satisfied in order to authenticate the user equipment.

2. The method as claimed in claim 1, comprising, when the first sequence number is identical to the second sequence number:

incrementing the second sequence number, and
reinitializing the second index.

3. The method as claimed in claim 1, comprising, when the first sequence number is identical to the previous value of the second sequence number and the first index is strictly greater than a second index stored in the user equipment:

storing the first index in the second index.

4. A method of mutual authentication between a user equipment and a communication network, said network comprising a mobility management entity and a subscriber server, said method, implemented by the subscriber server comprising:

receiving an authentication data request, calculating and sending to the mobility management entity an authentication datum comprising an expected authentication result and an authentication token, said authentication token being a function of an index and of a first authentication message which is a function of a first sequence number, receiving, in response to the network having been authenticated by the user equipment, a second authentication message, which is a function of a previous value of a second sequence number stored in the user equipment, calculating a second authentication message by using the first sequence number and comparing the first and the second authentication messages to authenticate the user equipment to the network, the mutual authentication being successful when the two authentication messages are equal.

5. The method as claimed in claim 4, comprising, when authentication is successful:

incrementing the first sequence number, and
reinitializing the index.

6. A method of mutual authentication between a user equipment and a telecommunications network, said network comprising a mobility management entity and a subscriber server, said method, implemented by the mobility management entity, comprising:

sending an authentication data request, receiving an authentication datum originating from the subscriber server, said authentication datum comprising an expected authentication result which is a function of a first sequence number, and an authentication token, said authentication token being a function of an index and of a first authentication message which is a function of a first sequence number, sending the authentication token included in the authentication datum to the user equipment, receiving, originating from the user equipment, an authentication result and an authentication message, said authentication message being a function of a previous value of a second sequence number stored by the user equipment, receipt of the authentication message indicating that the network is authenticated with the user equipment;

when the authentication result received from the user equipment is not equal to the expected authentication result received from the server, indicating that the authentication of the user equipment with the network has failed, ending said method, otherwise, sending the authentication message to the subscriber server when the authentication result received from the user equipment is equal to the expected authentication result received from the server, indicating that the user equipment is authenticated with the network.

7. A user equipment of a telecommunications network, said network comprising a mobility management entity and a subscriber server, comprising:

a processor; and a non-transitory computer-readable medium comprising instructions stored thereon, which when executed by the processor configure the user equipment to perform acts comprising:

receiving an authentication challenge comprising an authentication token, the authentication token being a function of a first index and of a first authentication message calculated by the subscriber server and which is a function of a first sequence number, verifying that one of the conditions belonging to a set of conditions is true, said set of conditions comprising:

the first sequence number is identical to a second sequence number stored in the user equipment, and the first sequence number is identical to a previous value of the second sequence number, and the first index is strictly greater than a second index stored in the user equipment, when neither of the conditions is true, indicating that the authentication of the network by the user equipment has failed, ending said method, otherwise, when one of the conditions is true, indicating that the network is authenticated by the user equipment, and calculating and sending an authentication result and an authentication message, which is a function of the previous value of the second sequence number, said authentication result being intended to be satisfied in order to authenticate the user equipment.

8. A subscriber server in a telecommunications network, said network comprising a user equipment and a mobility management entity, comprising:

a processor; and a non-transitory computer-readable medium comprising instructions stored thereon, which when executed by the processor configure the subscriber server to perform acts comprising:

receiving an authentication data request, calculating and sending to the mobility management entity an authentication datum comprising an expected authentication result, an authentication token, said authentication token being a function of a first index and of a first authentication message which is a function of a first sequence number, receiving, in response to the network having been authenticated by the user equipment, a second authentication message, originating from the user equipment and transmitted by the mobility management entity, which is a function of a previous value of a second sequence number stored in the user equipment, calculating a second authentication message by using the first sequence number and comparing the first and the second authentication messages to authenticate the user equipment to the network, the mutual authentication being successful when the two authentication messages are equal.

9. A mobility management entity for managing mobility in a telecommunications network, said network comprising a user equipment and a subscriber server, comprising:

a processor; and a non-transitory computer-readable medium comprising instructions stored thereon, which when executed by the processor configure the mobility management entity to perform acts comprising:

sending an authentication data request, receiving an authentication datum originating from the subscriber server, said authentication datum comprising an expected authentication result which is a function of a first sequence number and an authentication token, said authentication token being a function of an index and of a first authentication message which is a function of a first sequence number, sending the authentication token included in the authentication datum to the user equipment, receiving, originating from the user equipment, an authentication result and an authentication message, said authentication message being a function of a previous value of a second sequence number stored by the user equipment, receipt of the authentication message indicating that the network is authenticated with the user equipment;

when the authentication result received from the user equipment is not equal to the expected authentication result received from the server, indicating that the authentication of the user equipment with the network has failed, ending said method, otherwise, sending the authentication message to the subscriber server when the authentication result received from the user equipment is equal to the expected authentication result received from the server, indicating that the user equipment is authenticated with the network.

* * * * *